United States Patent [19]
Bell

[11] Patent Number: 5,982,784
[45] Date of Patent: Nov. 9, 1999

[54] BANDWIDTH SHARING FOR REMOTE AND LOCAL DATA TRANSFERS USING MULTICARRIER MODULATION OVER COMMON TRANSMISSION MEDIUM

[75] Inventor: Russell W. Bell, Austin, Tex.

[73] Assignee: Advanced Micro Devices, Austin, Tex.

[21] Appl. No.: 08/888,654

[22] Filed: Jul. 7, 1997

[51] Int. Cl.[6] ........................................................ H04J 1/02
[52] U.S. Cl. ............................................ 370/485; 370/494
[58] Field of Search .................................... 370/343, 485, 370/486, 487, 489, 490, 494, 495, 468, 443, 437; 375/222, 224, 227, 252, 241, 493, 484, 488

[56] References Cited

U.S. PATENT DOCUMENTS 5,812,786  9/1998  Seazholtz et al. ..................... 709/233

Primary Examiner—Chi H. Pham
Assistant Examiner—Brenda Pham
Attorney, Agent, or Firm—Merchant & Gould P.C.

[57] ABSTRACT

A system and method for allowing concurrent local and remote network data transfers on a common data transmission link using frequency bandwidth partitioning and reservation is provided. Multiple frequency bandwidth segments are configured for remote data transmissions between the local network and the remote service provider. Selected frequency bandwidth segments are reserved for local data transmissions by preventing, under the control of the local network, the reserved frequency bandwidth segment from being configured for the remote data transmissions. Concurrent local and remote data transmissions are allowed on the common transmission medium, where the local data transfers occur on the reserved frequency bandwidth segments, and the remote data transfers occur on the remaining non-reserved frequency bandwidth segments.

26 Claims, 5 Drawing Sheets

BANDWIDTH SHARING FOR REMOTE AND LOCAL DATA TRANSFERS USING MULTICARRIER MODULATION OVER COMMON TRANSMISSION MEDIUM

FIELD OF THE INVENTION

The present invention is directed generally to data communications, and more particularly to a system and method for allowing concurrent local and remote network data transfers on a common data transmission link using frequency bandwidth partitioning and reservation.

BACKGROUND OF THE INVENTION

Computer networking involves the linking of computers, peripheral devices, and perhaps telephonic devices, into a consolidated data communications system. Technological networking advances are taking place at various networking levels, including multi-node network structures such as multipoint, star, ring, loop and mesh network topologies used in networks ranging from local area networks (LAN) to proliferative global area networks (GAN) such as the Internet. Of great consequence to the continued success of computer networking is the ability to efficiently and economically interconnect these various networks in local and remote configurations.

As networks continue to gain acceptance and favor, there is a continuing desire to transmit ever-increasing amounts of data across the transmission medium in a given amount of time. In other words, the increased demand for network solutions has propelled the need to maximize the data bandwidth. This need has led to many techniques and systems for increasing the data bandwidth, such as the use of T-carrier services (e.g., T1 and T3), and integrated services digital networks (ISDN).

Emerging applications for higher speed communications applications have driven the need for advanced technologies that leverage the installed base of communications platforms around the world. One such technology allows relatively high-speed data transmission over existing copper-based twisted-pair lines. This technology, referred to as digital subscriber line (DSL) technology, includes various species, including high-bit-rate DSL (HDSL), very high-bit-rate (VHDSL), and asymmetric DSL (ADSL). These various types of digital subscriber line technologies are generically referred to as "xDSL" technologies. Each of these technologies allows digital information to be transferred from a service provider, via the existing copper telephone lines, at rates as high as 6 megabits/sec (Mbps). Typically, an ADSL line can provide rates near 6 Mbps downstream from a service provider, and 384 Kbps upstream to the provider using the existing telephone line. As can be seen, these data rates far exceed many competing technologies (ISDN: 128 Kbps, T1: 1.544 Mbps, etc.). These higher digital connectivity data rates are being demanded by users for Internet access, telecommuting, video conferencing, and the like.

ADSL often uses one of two modulation schemes, including discrete multi-tone (DMT) and carrierless amplitude-phase (CAP) modulation. DMT is a technology that divides the available carrier frequency bandwidth of a channel into multiple bandwidth sections. Each of these sections is "characterized" for noise and attenuation. After the characteristics of the channel are known, the transmitters and receivers can compensate for the deficiencies in the transmission path. A carrier tone within each of the channels (i.e., bandwidth sections) is used for transferring the data bits. A frequency "band" includes a group of contiguous bandwidth sections, where deficient bands receive fewer data bits to transmit than do more operable bands. The aggregate effect of this carrier frequency channelization is higher data bandwidth over the channel.

CAP modulation is also an out-of-band modulation technique. CAP modulation attempts to equalize the line using digital techniques, by learning the channel characteristics, and applying the inverse of those characteristics on the receiving side of the channel. The net effect of this equalization is to provide a more ideal channel response.

The significance of the use of the existing telephony copper base should not be underestimated. The undepreciated world-wide value of this asset has been estimated at over 600 billion dollars. There are approximately 700 million local loops around the world, and over 160 million of these are in the United States. It would therefore be desirable to utilize this pre-installed communications base, as physical connectivity costs would be greatly reduced.

Connections by individual computer users to networks such as the Internet has grown at astronomical rates. Moreover, surveys have indicated that many Internet subscribers have more than one computer at a local site, and it appears this trend will continue. Therefore, it is also becoming more common to connect small office/home office (SOHO) computers and other devices into a local network configuration within the SOHO environment.

The aforementioned xDSL techniques have been applied to connect external information systems to subscriber nodes. However, in order to connect computing devices into a local network, most of the available interconnection technologies require the user to install additional cabling. While XDSL techniques have been used to transmit data across existing copper twisted-pair telephone lines in a remote networking configuration, they have not been used in a local environment using a common transmission medium and a common modulation technique while allowing local network communications to be distinguished from remote communication transfers.

The present invention provides a solution to these and other shortcomings of the prior art, and provides other advantages over the prior art.

SUMMARY OF THE INVENTION

Generally, the present invention relates to a system and method for allowing concurrent local and remote network data transfers on a common data transmission link using bandwidth partitioning and reservation.

In accordance with one embodiment of the invention, a method for allowing local and remote data transmissions via a common transmission medium is provided. A local network includes a plurality of local nodes, and a remote network includes the local nodes of the local network and a remote service provider. Multiple frequency bandwidth segments are configured for remote data transmissions between the local network and the service provider. Selected frequency bandwidth segments are reserved for local data transmissions by preventing the reserved frequency bandwidth segment from being configured for the remote data transmissions. The local network is responsible for reserving the selected frequency bandwidth segments for local data transmissions. Concurrent local and remote data transmissions are therefore allowed on the common transmission medium, where the local data transfers occur on the reserved frequency bandwidth segments, and the remote data transfers occur on the remaining non-reserved frequency bandwidth segments.

In accordance with another embodiment of the invention, a system for transmitting data between local nodes on a local network, and between the local nodes and a remote node is provided. Remote data transmissions between the remote node and the local nodes takes place on the same physical connection as is used for local data transmissions among the local nodes. A service provider is coupled between the local network and the remote node to configure multiple carrier frequency ranges for the remote data transmissions. A master node, which is integrated within the local network and coupled to the service provider via the network connection, provides bandwidth reservation to prevent the configuration of selected carrier frequency ranges for remote data transmissions, which in effect reserves these selected carrier frequency ranges for local data transmissions among the local nodes.

In accordance with yet another embodiment of the invention, XDSL networking is brought into a local SOHO environment, thereby providing for a local area network compatible with a remote network that includes the nodes of the SOHO environment. A method for providing such a local area network within the remote network is provided. The method allows concurrent local and remote data transmissions via a common transmission medium, where the remote data transmissions are communicated by way of carrier frequencies established by a multicarrier frequency modulator. Electrical signals are injected onto the common transmission medium within the local network during an attempted initialization of selected carrier frequencies. These electrical signals are perceived as electrical noise at the multicarrier frequency modulator, which in turn prohibits remote data transmissions on these selected carrier frequencies. The local data can therefore be transmitted on the selected carrier frequencies concurrently with remote data transmissions which are transmitted on the remaining carrier frequencies.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
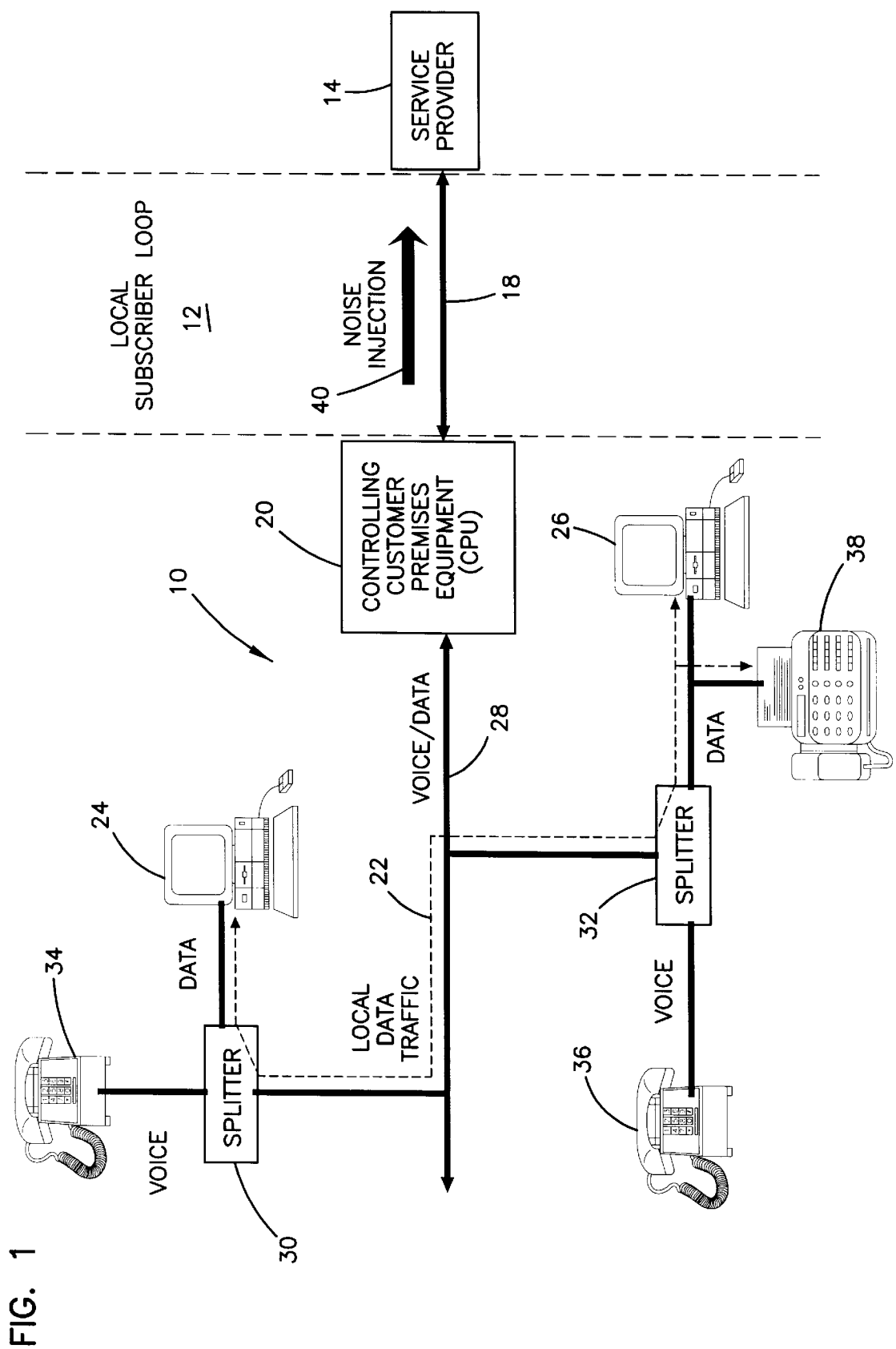
FIG. 1 is a diagram of one embodiment of a small office/home office (SOHO) environment in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention generally provides a system and method for allowing data to be transmitted between remote network service providers and local computing systems, while allowing data to be concurrently transmitted among the local computing systems over the same physical transmission medium that provides for the remote data communication. The present invention is particularly suited for use in computing environments which do not have existing local network cabling. For example, SOHO environments may use existing telephone wiring to connect to the telephone. This wiring may also be used to interconnect computers and related equipment within the SOHO environment. A technique for using the existing telephone wires to establish a network of SOHO equipment is described in copending U.S. patent application, Ser. No. 08/744,438, filed on Nov. 8, 1996, entitled "Network Adapter Utilizing an Ethernet Protocol and Utilizing a Digital Subscriber Line Physical Layer Driver for Improved Performance", which is assigned to the assignee of the instant application. A technique for logically converting multi-point network structures to a series of point-to-point links, for assisting in establishing the network of SOHO equipment using telephone lines, is described in copending U.S. patent application, Ser. No. 08/820,526, filed on Mar. 19, 1997, entitled "Multipoint Access Protocol Utilizing a Point-to-Point Methodology", also assigned to the assignee of the instant application. While the invention is not so limited, a better appreciation of the invention will be gained through a discussion of various examples, operating in such an environment.

In one embodiment, a common transmission medium is utilized by reserving a particular segment of the total available carrier frequency bandwidth for each point-to-point connection in the local network. In this manner, local data communications can occur within the reserved bandwidth segments, while data communications with a node remote to the local network (e.g., remote communications) can occur concurrently on the bandwidth segments that are not reserved for local data transfers. The carrier frequency bandwidth reservation can be accomplished by injecting noise signals onto the physical transmission medium during an initialization period (or re-initialization period), at which time each multicarrier bandwidth segment is analyzed for data transmission viability. The injection of noise at a particular carrier bandwidth segment effectively reserves that bandwidth segment for local data transfers, as the remote service provider inhibits the use of that bandwidth segment for remote data transfers based on its apparently poor transmission capability.

The invention as described herein may be used in connection with many physical communications service links, such as xDSL technologies. Furthermore, the invention as described herein may also be used in connection with various multicarrier modulation techniques, such as orthogonal quadrature amplitude modulation (OQAM) and discrete multi-tone (DMT) modulation. Thus, while the present invention may be applicable to many various digital communication environments, an appreciation of various aspects of the invention will be gained through the following example diagrams and corresponding description, in which a twisted pair communication medium using xDSL and a DMT modulation technique is described.

Referring now to FIG. 1, one embodiment of a small office/home office (SOHO) environment in accordance with one aspect of the present invention is illustrated. The local network 10 representing the SOHO environment is connected to a service provider 14 via the local subscriber loop 12. The subscriber loop 12 can represent any network connection configuration, however in a more particular sense it is a term that defines the copper telephone wire running between a customer's site and the local telephone company. In such a case, the service provider 14 represents the central office of the telephone company, where the physical medium comprising the local loop 12 is a standard twisted-pair cable 18 commonly used in local loop telephone connections. In an XDSL system, the service provider 14 represents the central office which transmits information across the local loop 12, where the central office includes XDSL modulation/demodulation technology for interfacing a remote internet service provider to the local network 10. While the service provider 14 represents the central office or other XDSL interfacing circuit, the following description includes the remote internet service provider within the concept of the service provider 14.

The network 10 can be any type of network, and is not limited to what is generally referred to as a local area network (LAN), but rather can be extended to any type of network. These networks include campus networks, as well as metropolitan area networks (MAN). For purposes of illustration, the network 10 of FIG. 1 is a LAN accommodating both voice and data equipment. Within the illustrated network 10 is a controlling customer premises equipment (CPE) device 20, which is coupled to the twisted-pair 18 of the local loop 12. The CPE 20 in this example acts as a master node of the local network 10. The master node CPE 20 is a part of the local network 10, however it is also assigned the additional responsibility of reserving various segments of carrier frequency bandwidth for transmitting data within the local network 10. It should be noted that any of the computing systems within the network 10 may be designated as the master node, and the CPE 20 device is designated as the master node for purposes of example only. Bandwidth partitioning and reservation will be described in further detail below.

The illustrated network 10 of FIG. 1 is configured in a bus topology, which is a connection that couples each work station in a parallel fashion. Signals are broadcast to all stations, but information is received only by the station to which it is addressed. Other network topologies are possible, including a star topology, a ring topology, as well as other topologies known in the art.

In order to effectively utilize the reserved segments of carrier frequency bandwidth at the network 10, local data transfers illustrated on dashed line 22 are to take place between devices or workstations within the network 10 on a point-to-point basis. The local data traffic illustrated in FIG. 1 is being sent, for example, from workstation 24 to workstation 26. It is therefore desirable to recognize multipoint network configurations as a collection of point-to-point network connections. The present invention allows information that is transmitted between devices of the network 10 on a point-to-point basis to use the same physical transmission medium and modulation technique as the information that is transmitted between the local network 10 and the service provider 14.

Both voice and data may be transmitted from the service provider 14 to the network 10, where it is routed via the local twisted-pair line 28. The signal splitters 30 and 32 are used to distinguish voice signals from data signals, to route the appropriate voice and data signals to the appropriate device within the network 10. For example, voice signals may be input to the splitter 30, which filters the voice signals from any information directed to the computer 24, while allowing the voice signals to be transmitted to the telephone equipment 34. The telephone equipment 34 is not limited to a telephone, but rather represents any telephonic equipment recognizing and/or allowing the transmission of signals in the voice frequency range. Alternatively, data signals passed through the CPE 20 on line 28 may be filtered from the telephone equipment 36 while being forwarded to the computer 26 and/or the facsimile equipment 38, or any other CPE equipment capable of recognizing and/or transmitting digital information.

In one embodiment of the invention, a multicarrier modulation technique is used for transmitting information over the digital subscriber lines between the network 10 and the service provider 14. As previously indicated, the invention may be used in connection with a variety of physical communication protocols utilizing twisted-pair telephone lines and multi-carrier modulation techniques. However, the present invention is particularly suited for discrete multi-tone (DMT) modulation techniques, and therefore the embodiments illustrated herein are described in a DMT context. In order to further facilitate the description of the invention, the embodiment shown in FIG. 1 assumes that a twisted-pair DSL transport system corresponds to the physical communication protocol.

In a DMT system, voice and data information can exist simultaneously. The present invention allows DMT and xDSL to be commonly used for remote and local data transmissions. This is accomplished by reserving carrier frequency bandwidth sections for local point-to-point data communication. DMT is a technology that dynamically adapts to changing noise environments, which theoretically means that the transmission reach can be improved by dynamically switching to frequencies with less interference. DMT introduces certain carrier "tones" on the line, and uses digital signal processing algorithms to measure what the signal-to-noise ratio (SNR) is for that tone. Depending on the SNR for that tone, a number of bits is assigned to be transmitted in that frequency bandwidth segment. The reserved bandwidth segments may represent a frequency range in which the data itself may be transmitted, or may alternatively represent a frequency range in which a carrier frequency (e.g., DMT modulation "tone") resides.

The master CPE equipment, CPE 20 in this example, is designated as the device to reserve carrier frequency bandwidth segments for the local communication transfers. CPE 20 is configured to purposefully inject noise, represented by line 40, onto the line 18 during bandwidth segment initialization where a particular tone is output to the line 18 in order to determine that segment's ability to transmit data. In this manner, the service provider 14 is led to believe that these particular bandwidth segments (where noise was purposefully injected) are too noisy to use for remote data transmissions. Because these carrier frequency bandwidth sections are not used for remote communications, they are in effect reserved for local point-to-point data communication, such as between computing units 24 and 26 via the local data traffic path 22.

Figure 2:
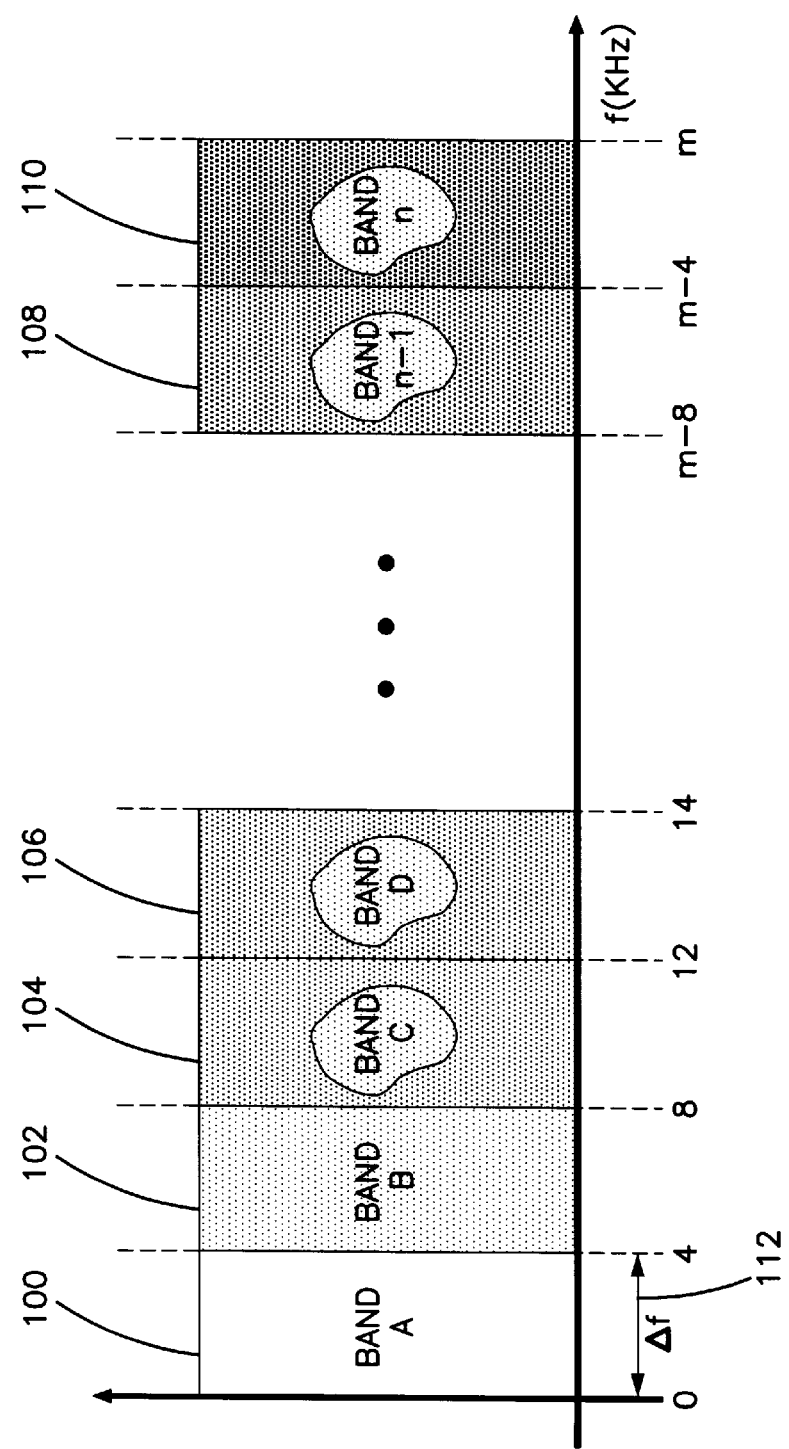
FIG. 2 illustrates the segmentation of the total carrier frequency bandwidth occupied using a multicarrier modulation technique.

FIG. 2 represents the segmentation of the total carrier frequency bandwidth occupied using a multi-carrier modulation technique such as DMT. This conceptual diagram illustrates the frequency bands in the frequency domain. Each of the frequency segments or "bands", labeled band A 100, band B 102, band C 104, band D 106, through band n−1 108 and band n 110, have a frequency bandwidth of Δf as represented by line 112. Although it is not necessary that each of the frequency bands have equal bandwidth, each of the bandwidth segments of FIG. 2 have a frequency bandwidth of approximately 4 KHz. The "m" total bandwidth segments comprise the entire available carrier frequency bandwidth.

By injecting noise on the line 18 during DMT initialization, selected bandwidth segments may be reserved for local data transfers. For example, noise may be injected during the initialization of band B 102 and band n−1 108. In this case, bands 102 and 108 could be used for point-to-point data communications between two different pairs of CPE nodes. These local data communications within each of the reserved bandwidth segments can be realized using various modulation techniques, such as frequency modulation, phase modulation, amplitude modulation, as well as other modulation techniques known in the art.

Figure 3:
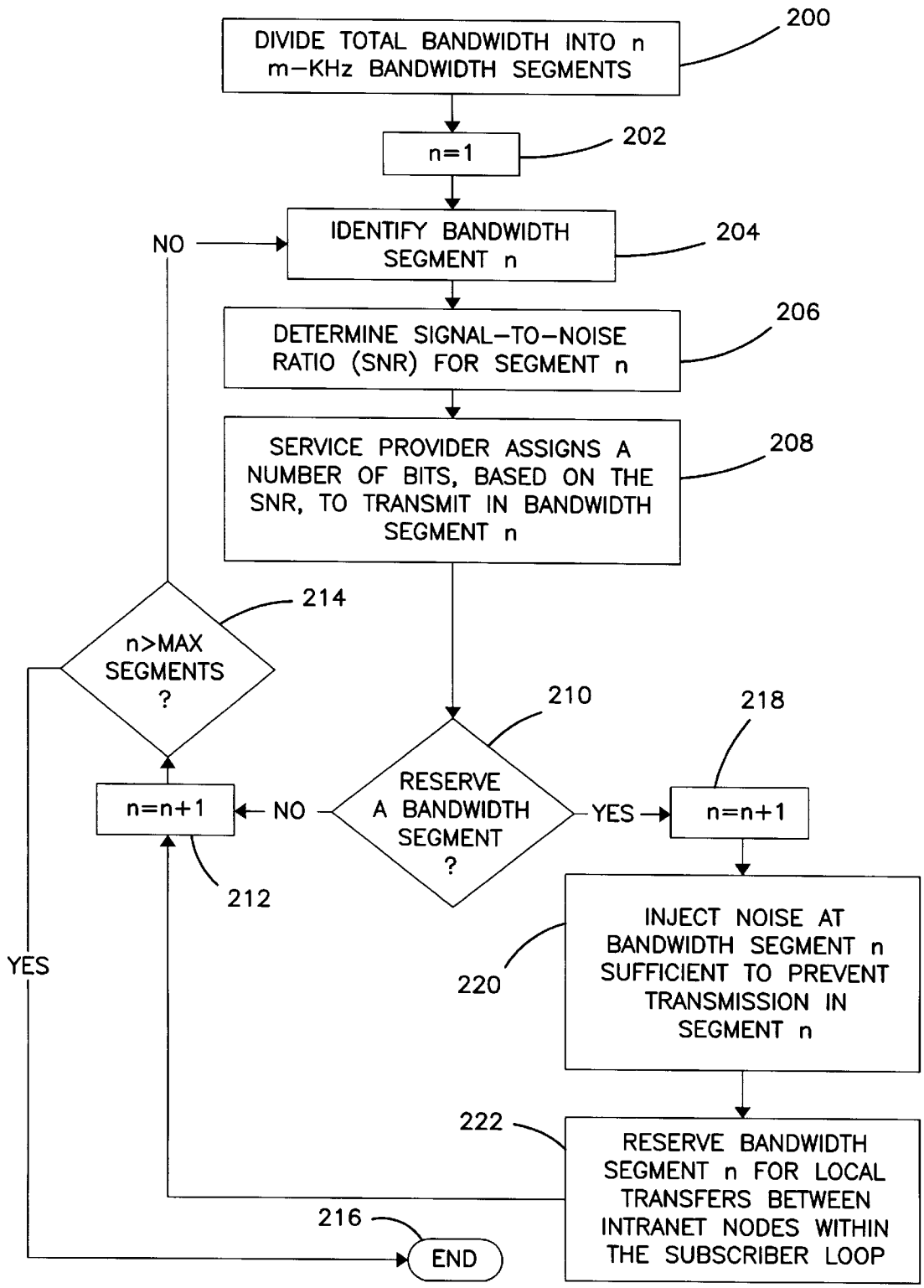
FIG. 3 is a flow diagram illustrating a multicarrier modulation initialization and frequency bandwidth segment reservation process in accordance with one embodiment of the present invention.

FIG. 3 is a flow diagram illustrating a DMT initialization process in which one or more carrier frequency bandwidth segments are reserved for local data communication in accordance with one embodiment of the present invention. During the DMT initialization process, the total bandwidth is divided into n mKHz bandwidth segments, as represented by block 200. As will be described more fully below, the initialization process for the illustrated embodiment includes analyzing each of the n bandwidth segments to determine the signal-to-noise ratio (SNR) and the corresponding availability for data transfer in that bandwidth.

The first of the bandwidth segments to be analyzed is the bandwidth segment where n equals 1, as represented at block 202. The service provider 14 is configured to identify 204 the bandwidth segment n, and determine 206 the signal-to-noise ratio (SNR) for that frequency range. Although the determination of the SNR for DMT modulation is generally known to those skilled in the art, a more detailed description of this process is provided in U.S. Pat. No. 5,479,447, issued to Chow et al. on Dec. 26, 1995.

The service provider assigns 208 a number of bits, based on the SNR, to be transmitted in bandwidth segment n. Each of the different bandwidth segments is analyzed in a similar manner to determine which of the bandwidth segments are capable of transmitting data between the service provider and the local network at the SOHO. As noted above, one of more of these bandwidth segments may be reserved for local data communication. If bandwidth segment n is not to be reserved 210 for local data communication, the next bandwidth segment is analyzed by incrementing 212 the value of n, and determining 214 whether all of the bandwidth segments have been initialized by a comparison to the maximum number of bandwidth segments to be initialized. If all of the bandwidth segments have been initialized, the initialization process ends 216. However, if more bandwidth segments are to be initialized, processing returns to block 204 where the next bandwidth segment to be initialized is identified.

As will be readily apparent to those skilled in the art form the foregoing description, the bandwidth segments do not have to be initialized in an "incrementing" order, but rather could be initialized in any desired sequence. Furthermore, the embodiment of the invention illustrated in FIG. 3 is not necessarily performed by a single algorithm or program at either the service provider or the local network. For example, in one embodiment of the invention, the functions corresponding to blocks 204, 206, 208 and 210 are performed at the service provider (e.g., central office), and the function of block 220 is performed by CPE at the local network. It should also be noted that the decision as to whether to reserve a bandwidth segment may be performed immediately after dividing 200 the bandwidth into n bandwidth segments, thereby allowing the first bandwidth segment to be reserved for local data transmission, without departing from the scope and spirit of the invention.

Where a bandwidth segment is to be reserved 210 for local data communication at the network 10, n is incremented 218 to the next bandwidth segment. Noise is then injected 220 at bandwidth segment n. The noise which is injected, represented by line 40 of FIG. 1, must be sufficient to prevent the assignment of any bits for transmission in bandwidth segment n. In a multicarrier modulation technique such as DMT, noisy bandwidth channels are rejected by the service provider for purposes of the transmission of data. The service provider perceives the noise to be aberrant and undesirable noise on that frequency channel, and designates that bandwidth channel as a channel unsuitable for data transmission. Signals on these bandwidth channels are subsequently ignored by the service provider or central office 14, although the signals may actually be received by the service provider 14. The bandwidth segment n, which is deemed unsuitable for remote data transmission, is thereby reserved 222 by the service provider that initialized the remote data communication. The bandwidth segment is reserved 222 in order to accommodate local transfers between local nodes within the subscriber loop. When this bandwidth segment n has been reserved 222, the next bandwidth segment is identified by incrementing n 212, determining 214 whether all of the bandwidth segments in the total bandwidth have been initialized, and continuing to block 204 where additional bandwidth segments are to be initialized.

Electrical noise injection may be accomplished in one of many manners presently known in the art. For example, commercial noise sourcing equipment typically used in testing electronic designs may be used. These commercial noise generators, provided by companies such as Noise Com (Paramus, N.J.) and Telecom Analysis Systems, Inc. (Eatontown, N.J.) provide flexibility in generating noise signals having various noise characteristics. Furthermore, electrical noise may be generated in several ways known to those skilled in the art, including using computing devices to generate random bit patterns which are converted to analog noise signals via a digital-to-analog (D/A) converter. Electrical circuits may also be used to develop a similar noise signal generator, where stored bit patterns (either preselected or randomly selected) are used to generate irregular or erratic signals perceived by the service provider to be noise. In one embodiment of the invention, predetermined signals, or "tokens", are passed between point-to-point node connections within the local network 10, even where no actual data needs to be transferred between the point-to-point node connections, so that the reserved frequency bandwidth appears to remain "noisy". Other examples of noise generation on a connection would be apparent to those skilled in the art from the foregoing description.

Due to the characteristics of DMT technology, the service provider will not recognize the local data transfers. This is true even though the local data communication takes place on the same physical medium (e.g., the twisted-pair telephone line) at the remote communications take place. This is because the service provider designates the noise-injected bandwidth segments as "unusable" segments, which are to be ignored. Therefore, even though local data transfers result in the data being present at the service provider (due to the common transmission medium), the service provider believes the data to be noise, and the data signals are ignored by the service provider. The service provider therefore does not use these apparently noisy bandwidth segments for remote communication, thereby leaving these bandwidth segments to be available for use at the local network.

Initialization of the multi-carrier modulation technique (e.g., DMT) for data transmission between the service provider 14 and the nodes of the local network 10 involves analyzing each of the carrier frequency bandwidth segments prior to transmitting data in that bandwidth segment. This allows one or more of the bandwidth segments to be reserved for local data communications between the nodes of the local network 10. However, multi-carrier modulation techniques such as DMT occasionally, or perhaps periodically, may seek to reinitialize those bandwidth segments that earlier proved to be of poor transmission quality. The determination that those bandwidth segments were of poor transmission quality was due to the purposeful injection of noise, as described previously. In accordance with one embodiment of the present invention, during these reinitialization attempts noise is again injected into the bandwidth segments that are being used for point-to-point local data communications transfers.

Figure 4:
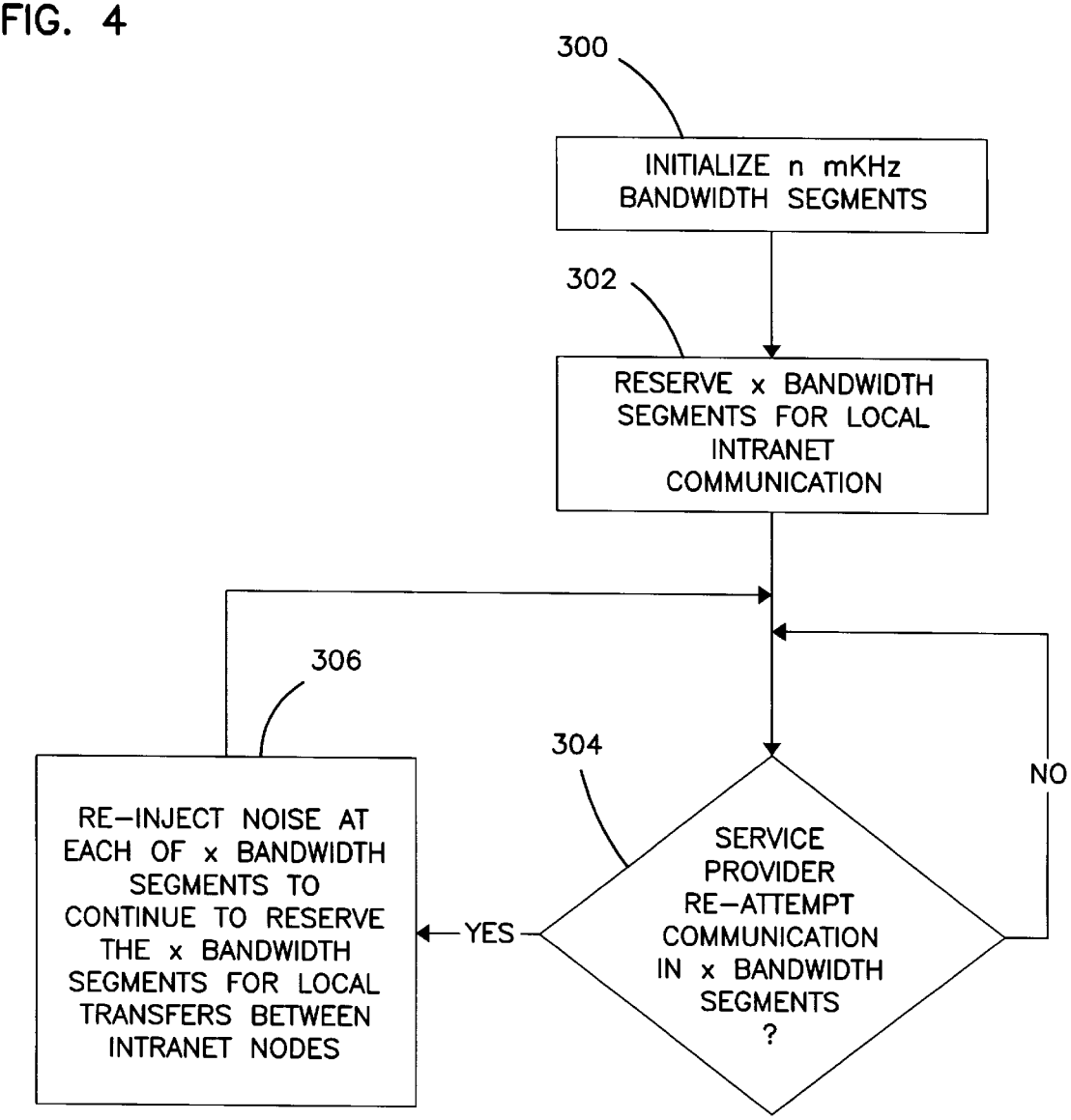
FIG. 4 is a flow diagram illustrating one manner in which one embodiment of the present invention manages multicarrier modulation reinitialization attempts.

Referring now to FIG. 4, a flow diagram illustrating one manner in which the present invention accounts for multi-carrier modulation reinitialization attempts is provided. As was described in connection with FIG. 3, n mKHz bandwidth segments are initialized 300 prior to initial data transfers between the service provider 14 and the nodes of the local network 10. A number, x, of bandwidth segments are reserved 302 for local data communication by injecting noise into the desired bandwidth segments as previously described. At pre-established times, or alternatively periodically, the service provider 14 may re-attempt 304 communication in the x bandwidth segments. If such an attempt to reestablish communication in the reserved bandwidth segments occurs, noise must be reinjected 306 at each of the x bandwidth segments to continue to reserve the bandwidth segments for local transfers between the local nodes. The reinjection of noise 306 is accomplished in a manner similar to the injection of noise during initialization, which was described in connection with the flow diagram of FIG. 3.

In one embodiment of the invention the initialization and reinitialization of bandwidth segments takes place for each point-to-point connection in the local network. The local network 10 may take on various network topologies, including multi-point network configurations and point-to-point network configurations. A point-to-point configuration refers to a network configuration wherein each of the nodes are connected to each other on a point-by-point basis. In other words, each of the nodes is connected to each other on a physical (hardware) level by way of dedicated physical connections. A multi-point configuration refers to a network where the nodes are connected to each other over a shared communication medium, such as a bus or ring network topology. For multi-point configurations, a multi-point protocol is generally required in order to avoid conflicts in allocation of the shared communication medium.

In one embodiment of the invention, multi-point network configurations are logically converted to a collection of point-to-point network connections. A different carrier frequency bandwidth segment is then reserved for each of the logical point-to-point network connections in the local network. For example, the local network may be configured in a bus topology. A multi-point to point-to-point conversion is then executed, and a total number of point-to-point connections result therefrom. Each of the resulting point-to-point connections will require at least one carrier frequency bandwidth segment, which is therefore reserved for this purpose. It is also possible, however, to reserve one or more carrier frequency bandwidth segments to be used in a multi-point network configuration, wherein at least one of the computing devices in the network controls local data transfers between the nodes of the local network.

Figure 5:
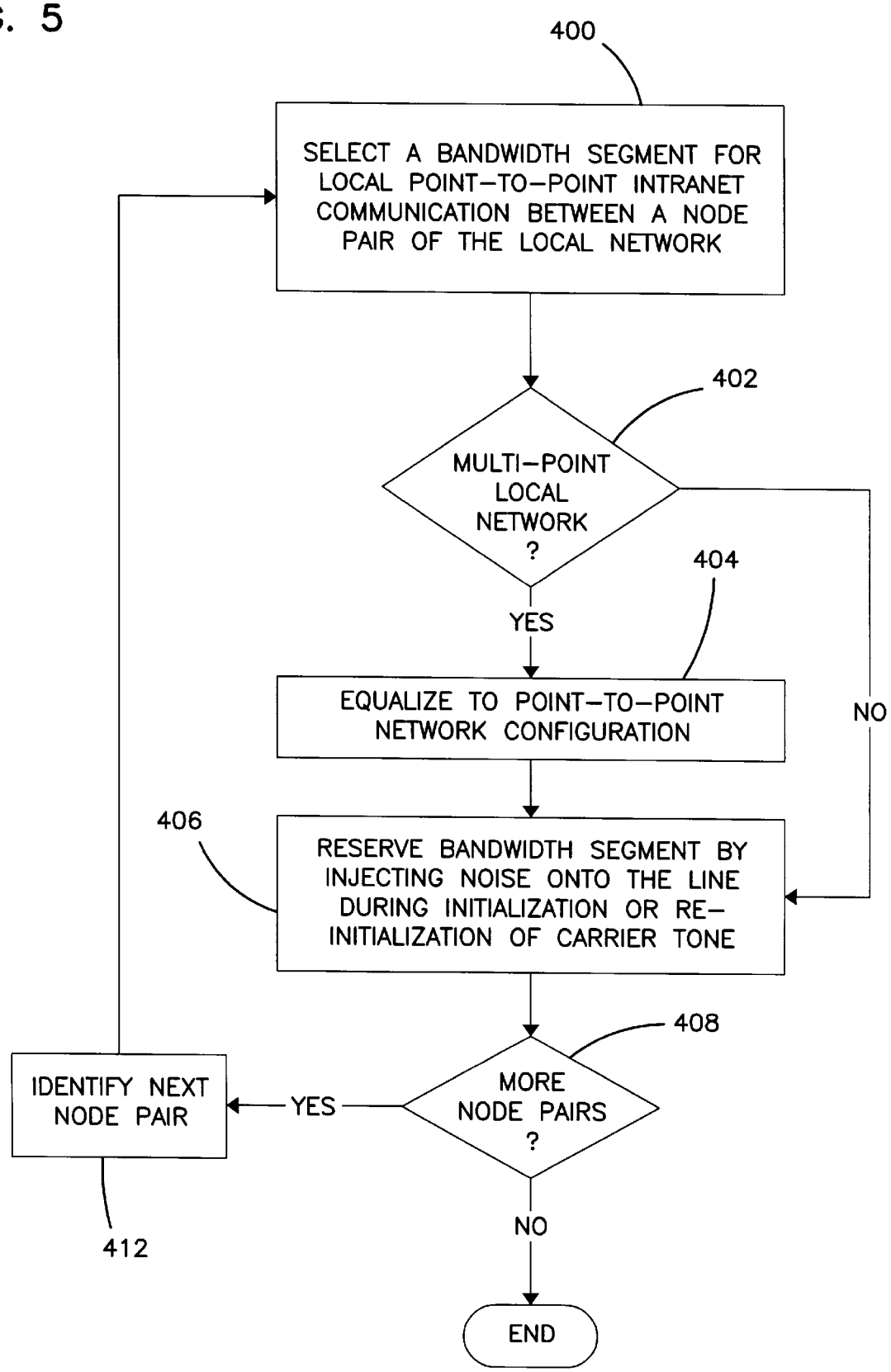
FIG. 5 is a flow diagram of one manner in which an embodiment of the invention uses the local network to reserve frequency bandwidth segments for local data transfers.

Referring now to FIG. 5, a flow diagram of one embodiment of the manner in which the local network reserves bandwidth segments for local data transfers is provided. A bandwidth segment is selected 400 for local point-to-point communication between a first pair of nodes of the local network. In one embodiment of the invention, a bandwidth segment is reserved for each point-to-point connection in the local network. In such a case, where the local network is a multi-point network 402, the multi-point network is logically (as opposed to "physically") converted, or equalized 404, to a point-to-point connection configuration. Recognition of multipoint network configurations as a collection of point-to-point network configurations may be determined in a manner described herein and in copending U.S. patent application, Ser. No. 08/820,526, filed on Mar. 19, 1997, entitled "Multipoint Access Protocol Utilizing a Point-to-Point Methodology", which is assigned to the assignee of the instant application, the contents of which are incorporated herein by reference.

In a case where the local network is configured on a point-to-point basis, logical conversion or equalization 404 is not needed. Where the local network is already configured on a point-to-point basis, or a multipoint network has been logically equalized 404 to a point-to-point configuration, a bandwidth segment is reserved 406 for the point-to-point connection. This is accomplished by injecting 406 noise onto the line during the initialization or reinitialization of the bandwidth segment, or of the carrier tone in the case of a DMT modulation scheme. If more point-to-point node pairs are present in the local network 10, the next node pair is identified 412, and a bandwidth segment is selected 400 for that point-to-point connection. This continues until there are no more node pairs 408 to be analyzed.

As noted above, the present invention provides a system and method for sharing carrier frequency bandwidth for remote and local data transfers, through the use of multi-carrier modulation, such as DMT, over a common transmission medium. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A method for allowing local and remote data transmissions via a common transmission medium forming a local network having a plurality of local nodes and a remote network connecting the local network to a service provider, the method comprising:

configuring a plurality of frequency bandwidth segments for remote data transmissions between the local network and the service provider;

reserving at least one of the frequency bandwidth segments for local data transmissions by preventing, under the control of the local network, the reserved frequency bandwidth segment from being configured for the remote data transmissions; and providing local and remote data transmissions via the common transmission medium, wherein the local data transmission is performed within the reserved frequency bandwidth segments.

2. The method of claim 1, wherein providing local and remote data transmissions comprises concurrently transmitting local data and remote data within the reserved frequency bandwidth segments and the configured frequency bandwidth segments respectively.

3. The method of claim 1, wherein providing local and remote data transmissions via the common transmission medium comprises providing the local and remote data transmissions via twisted-pair cabling of the plain old telephone system (POTS).

4. The method of claim 3, wherein the local and remote data transmissions provided via the twisted-pair cabling are transmitted by employing one of a plurality of digital subscriber line (xDSL) data link services.

5. The method of claim 1, wherein providing local and remote data transmissions are effected by modulating the data using a multicarrier modulation technique.

6. The method of claim 5, wherein the multicarrier modulation technique is discrete multi-tone (DMT) modulation.

7. The method of claim 1, wherein configuring comprises analyzing each of the frequency bandwidth segments for data transmission viability.

8. The method of claim 7, wherein reserving at least one of the frequency bandwidth segments comprises injecting electrical noise signals on the common transmission medium during viability analyzation of the at least one frequency bandwidth segment.

9. The method of claim 8, wherein injecting electrical noise signals comprises injecting noise sufficient to surpass a predetermined signal-to-noise ratio (SNR) when the service provider is analyzing the SNR of a particular one of the frequency bandwidth segments, thereby allowing the particular frequency bandwidth segment to appear to the service provider to be unsuitable for data transmission.

10. The method of claim 8, wherein injecting electrical noise signals comprises generating random electrical signals on the common transmission medium when the service provider is analyzing the signal-to-noise ratio (SNR) of a particular one of the frequency bandwidth segments.

11. The method of claim 8, wherein injecting electrical noise signals comprises periodically passing signal tokens between each point-to-point node connection within the local network when the service provider is analyzing the signal-to-noise ratio (SNR) of a particular one of the frequency bandwidth segments.

12. The method of claim 8, wherein reserving at least one of the frequency bandwidth segments further comprises re-injecting the electrical noise signals on the common transmission medium during predetermined re-initialization attempt periods.

13. The method of claim 1, wherein preventing the reserved frequency bandwidth segment from being configured for the remote data transmissions comprises dedicating at least one of the plurality of the local nodes as a master node, and generating electrical noise signals at the master node for injection onto the common transmission medium during viability analyzation of the reserved frequency bandwidth segment.

14. The method of claim 1, further comprising logically converting each pair of the local nodes in a multipoint configuration to a logical point-to-point node connection.

15. The method of claim 14, wherein reserving at least one of the frequency bandwidth segments comprises reserving one of the frequency bandwidth segments for each of the logical point-to-point node connections.

16. A system for transmitting data between local nodes on a local network, and between one or more of the local nodes and a remote node utilizing the network connection used in connecting the local nodes, comprising:

a service provider coupled between the local network and the remote node to configure a plurality of carrier frequency ranges for remote data transmissions between the local network and the remote node; and a master node integrated within the local network and coupled to the service provider via the network connection, having bandwidth reservation means to prevent the configuration of one or more of the carrier frequency ranges for remote data transmissions, thereby reserving the one or more carrier frequency ranges for local data transmissions between the local nodes.

17. The system as in claim 16, wherein the service provider comprises a public switched telephone network (PSTN) central office having a plurality of modulator/demodulator circuits to provide for the remote data transmissions between the local network and the central office.

18. The system as in claim 17, wherein the modulator/demodulator circuits are xDSL modems establishing an xDSL link between the local network and the central office.

19. The system as in claim 16, wherein the service provider comprises a discrete multi-tone (DMT) modulator to divide a total available bandwidth into the plurality of carrier frequency ranges, and to analyze data transmission viability within each of the plurality of carrier frequency ranges.

20. The system as in claim 19, wherein the bandwidth reservation means comprises means for generating electrical signals to be driven onto the network connection during the data transmission viability analyzation of the one or more carrier frequency ranges to be reserved for local data transmissions.

21. The system as in claim 20, wherein the generating means comprises a hardware electrical noise generator.

22. The system as in claim 20, wherein the generating means comprises a digital-to-analog converter to generate random analog signals from random software-generated digital values.

23. The system as in claim 20, wherein the generating means comprises means for periodically passing signal tokens between each local node connection when the service provider is analyzing the data transmission viability of a selected one of the carrier frequency ranges to be reserved for local data transmissions.

24. A method for allowing concurrent local and remote data transmissions via a common transmission medium, wherein the remote data transmissions are communicated via a plurality of carrier frequencies established by a multicarrier frequency modulator, comprising:

injecting electrical signals at the local network onto the common transmission medium during an attempted initialization of selected ones of the carrier frequencies;

perceiving the electrical signals as electrical noise at the multicarrier frequency modulator and prohibiting the remote data transmissions on the selected carrier frequencies; and concurrently allowing the local data to be transmitted on the selected carrier frequencies and the remote data to be transmitted on the remaining carrier frequencies.

25. The method of claim 24, wherein the multicarrier frequency modulator is a discrete multi-tone (DMT) modulator.

26. The method of claim 24, further comprising periodically reinjecting the electrical signals onto the common transmission medium during attempted reinitializations of the selected ones of the carrier frequencies.

* * * * *

UNITED STATES PATENT AND TRADEMARK OFFICE
CERTIFICATE OF CORRECTION

PATENT NO. : 5,982,784
DATED : November 9, 1999
INVENTOR(S) : Russell W. Bell

It is certified that error appears in the above-identified patent and that said Letters Patent is hereby corrected as shown below:

Column 1, line 31, delete "XDSL" and insert therefor -- xDSL --.

Column 3, line 18, delete "XDSL" and insert therefor -- xDSL --.

Column 5, line 18, delete "XDSL" and insert therefor -- xDSL --; line 21, delete "XDSL" and insert therefor -- xDSL --; and line 24, delete "XDSL" and insert therefor -- xDSL --.

Signed and Sealed this

Tenth Day of April, 2001

Attest:

NICHOLAS P. GODICI

Attesting Officer

Acting Director of the United States Patent and Trademark Office